(No Model.) 2 Sheets—Sheet 1.
W. C. SLY.
PARACHUTE.
No. 582,377. Patented May 11, 1897.
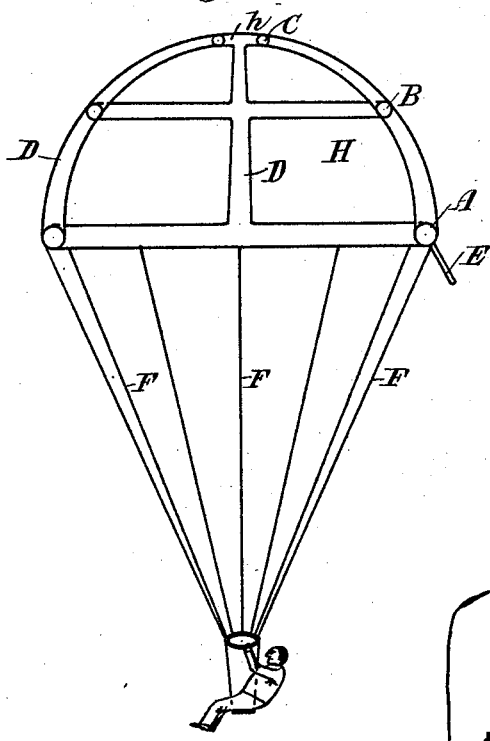
Fig. 1.
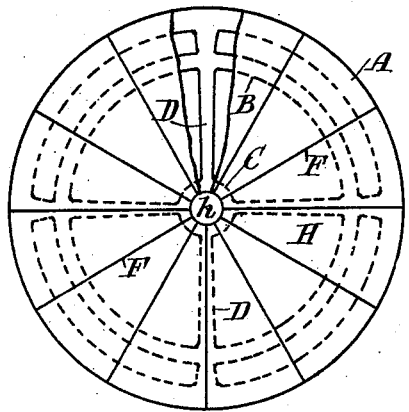
Fig. 7. Fig. 8.
Fig. 2.
Witnesses:—
Edward Vieser.
George Barry Jr.
Inventor:—
William C. Sly
by attorneys
Brown & Seward (No Model.) 2 Sheets—Sheet 2.
W. C. SLY.
PARACHUTE.

No. 582,377. Patented May 11, 1897.

Witnesses:—
Edward Vieser
George Barry Jr.

Inventor:
William C. Sly
by attorneys
Brown & Seward

UNITED STATES PATENT OFFICE.

WILLIAM C. SLY, OF BROCKLEY, ENGLAND.

PARACHUTE.

SPECIFICATION forming part of Letters Patent No. 582,377, dated May 11, 1897.

Application filed October 24, 1896. Serial No. 609,877. (No model.)

*To all whom it may concern:*

Be it known that I, WILLIAM COWELL SLY, engineer, of 21 Tressillian Crescent, Brockley, in the county of Kent, England, have invented certain new and useful Improvements Relating to Parachutes, of which the following is a specification.

The present invention has reference to means whereby parachutes and similar aerial conveyances may be mechanically opened and held open, so as to prevent them from collapsing in an improper or untimely manner.

Hitherto the means suggested to this end have comprised a more or less rigid framework of metal or wood, which is inconvenient for transport and manipulation, besides adding considerably to the weight of the parachute.

According to this invention I employ, in connection with a parachute, balloon, or similar aerial conveyance, the skin or exterior of which is made of a pliable material, a flexible framing consisting of one or more flexible air-tight tubes attached to the said skin, which tube or tubes is or are capable of inflation by means of a bellows, air-pump, or similar appliance. When sufficiently inflated, the tubes assume a rigidity which will cause the parachute or balloon to assume and retain the degree of expansion predetermined and required.

In the accompanying drawings I have shown various arrangements of tubes by way of illustrating my invention.

Figure 3:
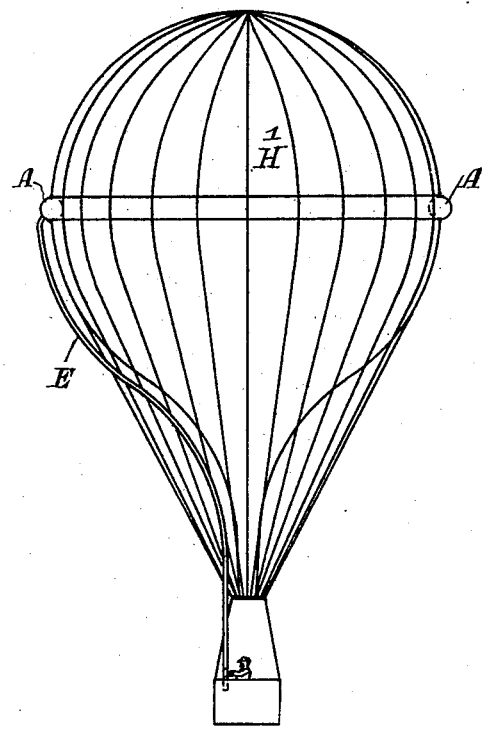
Figure 6:
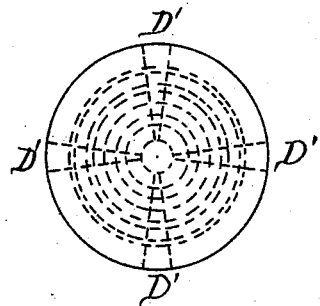
Figure 5:
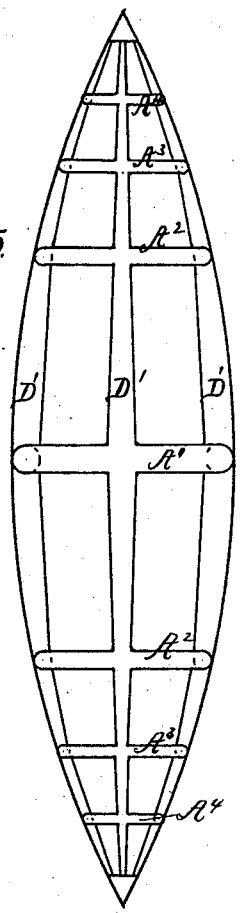
Figure 4:
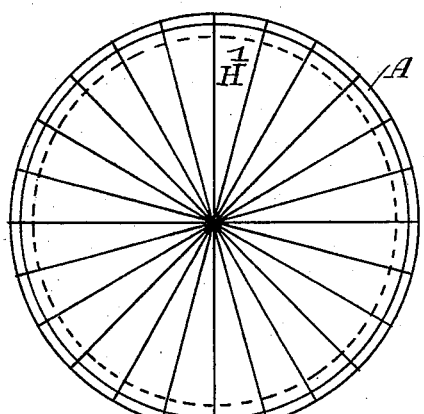

Figure 1 shows in side view a distended parachute. Fig. 2 is a plan thereof. Fig. 3 shows in side view a balloon provided with a single inflated ring or rib. Fig. 4 shows a plan thereof. Fig. 5 shows in side view a cigar-shaped air-ship strengthened with a series of inflated tubes. Fig. 6 is an end view of the same, and Figs. 7 and 8 show in detached front view and section a mode of attaching the air-tube to the edge of a parachute.

Referring to Figs. 1 and 2, A B C are three air-tight or pneumatic rings of varnished or oiled silk, india-rubber, or other suitable flexible material connected together by air-tight flexible tubular ribs or stays D. These rings and stays, secured inside the skin of the parachute H and constituting a flexible frame therefor, are inflated to a convenient pressure through air-inlet tube E by any suitable means. On being fully inflated the said frame will distend the parachute H and render it fully open, also giving it rigidity and strength (without adding appreciably to its weight) to support the parachutist without collapsing. A hole can be left at *h* for the convenience of working and releasing the parachute from the balloon or roof of the building.

F F are ropes passing over the top of the parachute and depending to support the parachutist.

The pneumatic rings A B C and ribs D can be inflated simultaneously from one inlet E, or they can, if preferred, be divided into compartments to be separately inflated.

Referring to Fig. 3, A is an inflated ring encircling the balloon H' and forming part of the cover thereof. Should the gas escape from the balloon from any accidental cause the latter will be prevented from entirely collapsing by the ring A, which, serving as a frame, will hold the skin of pliable fabric distended, thus forming a parachute and retarding the velocity of its descent.

For elongated balloons or cigar-shaped aerial vessels I use a frame of corresponding form composed of a series of flexible tubular rings $A'$ $A^2$ $A^3$ $A^4$ and ribs D', filled with air sufficiently to give them the necessary rigidity, as shown in Figs. 5 and 6, thus transforming them into parachutes in case of bursting, as well as giving rigidity to the structure and preventing collapse.

I may remark that I have found that an inflated ring having a section of twelve inches or thereabout will hold distended a parachute of twenty feet diameter. It is obvious, however, that the dimensions and capacity of the inflated framework must depend upon circumstances. The rings may be placed either inside or outside the balloons and aerial vessels and each ring may be inflated separately or the whole framework of rings and ribs may be inflated simultaneously.

For attaching an inflatable stiffening-ring A to the edge of the fabric G, of which the head of a parachute is formed, hooks *g* may be attached in any suitable manner to the said edge and the ring suspended in the said hooks, as shown in Figs. 6 and 7. This constitutes a ready means for the attachment and detachment of the ring.

It will be understood that the employment of inflatable stays or ribs does not interfere with the portability of the parachute or balloon, as they are readily deflated and do not augment the weight in any material degree.

What I claim is—

The combination with the pliable skin of an aerial conveyance, of a flexible air-tight tubular framing by the inflation of which the said skin is rigidly distended, substantially as herein described.

WILLIAM C. SLY.

Witnesses:
H. K. WHITE,
H. F. C. GOLTZ.